(12) United States Patent
Bradley et al.

(10) Patent No.: US 7,194,477 B1
(45) Date of Patent: Mar. 20, 2007

(54) OPTIMIZED A PRIORI TECHNIQUES

(75) Inventors: Paul Bradley, Bellevue, WA (US);
Stella Chan, Kirkland, WA (US);
Usama Fayyad, Bellevue, WA (US);
Neal Rothleder, Kirkland, WA (US);
Radha Krishna Uppala, Redmond, WA (US)

(73) Assignee: Revenue Science, Inc., Bellevue, WA (US)

( * ) Notice: Subject to any disclaimer, the term of this patent is extended or adjusted under 35 U.S.C. 154(b) by 410 days.

(21) Appl. No.: 10/187,392

(22) Filed: Jun. 28, 2002

Related U.S. Application Data

(60) Provisional application No. 60/301,917, filed on Jun. 29, 2001.

(51) Int. Cl.
*G06F 7/00* (2006.01)
*G06Q 30/00* (2006.01)

(52) U.S. Cl. .................. 707/102; 707/100; 707/104.1; 707/101; 705/14; 705/26

(58) Field of Classification Search .................... 707/3, 707/6, 10, 100–104.1; 705/14, 26
See application file for complete search history.

(56) References Cited

U.S. PATENT DOCUMENTS

| | | | | |
|---|---|---|---|---|
| 5,414,809 A | * | 5/1995 | Hogan et al. ................ 715/765 |
| 5,619,709 A | * | 4/1997 | Caid et al. .................. 715/532 |
| 5,748,955 A | * | 5/1998 | Smith ......................... 707/101 |

(Continued)

*Primary Examiner*—John E. Breene
*Assistant Examiner*—Anh Ly
(74) *Attorney, Agent, or Firm*—Perkins Coie LLP

(57) ABSTRACT

A facility for identifying groups of items that co-occur in more than a threshold number of instances is described. Each such group of items has a size reflecting the number of items in the group. The facility uses a data structure comprising, for each of a plurality of group sizes, a single map identifying groups of that group size that co-occur in more than a threshold number of instances.

4 Claims, 9 Drawing Sheets

U.S. PATENT DOCUMENTS

| | | | |
|---|---|---|---|
| 5,852,822 A * | 12/1998 | Srinivasan et al. | 707/4 |
| 5,950,183 A * | 9/1999 | Minobe et al. | 706/52 |
| 5,987,460 A * | 11/1999 | Niwa et al. | 707/6 |
| 5,987,468 A * | 11/1999 | Singh et al. | 707/100 |
| 6,154,213 A * | 11/2000 | Rennison et al. | 707/104.1 |
| 6,175,835 B1 * | 1/2001 | Shadmon | 707/102 |
| 6,266,649 B1 * | 7/2001 | Linden et al. | 705/26 |
| 6,278,997 B1 * | 8/2001 | Agrawal et al. | 707/6 |
| 6,317,722 B1 * | 11/2001 | Jacobi et al. | 705/14 |
| 6,334,127 B1 * | 12/2001 | Bieganski et al. | 707/5 |
| 6,523,026 B1 * | 2/2003 | Gillis | 707/3 |
| 6,539,395 B1 * | 3/2003 | Gjerdingen et al. | 707/102 |
| 6,618,725 B1 * | 9/2003 | Fukuda et al. | 707/6 |
| 6,625,611 B1 * | 9/2003 | Teig et al. | 707/102 |
| 6,654,761 B2 * | 11/2003 | Tenev et al. | 707/102 |
| 6,675,173 B1 * | 1/2004 | Shadmon | 707/102 |
| 6,760,714 B1 * | 7/2004 | Caid et al. | 706/14 |
| 6,839,682 B1 * | 1/2005 | Blume et al. | 705/10 |
| 6,912,505 B2 * | 6/2005 | Linden et al. | 705/14 |
| 6,976,211 B2 * | 12/2005 | Lection et al. | 707/9 |
| 6,993,532 B1 * | 1/2006 | Platt et al. | 707/102 |
| 2001/0021914 A1 * | 9/2001 | Jacobi et al. | 705/8 |
| 2001/0054039 A1 * | 12/2001 | Weber | 707/3 |
| 2002/0059202 A1 * | 5/2002 | Hadzikadic et al. | 707/3 |
| 2002/0198882 A1 * | 12/2002 | Linden et al. | 707/10 |
| 2003/0009467 A1 * | 1/2003 | Perrizo | 707/100 |
| 2003/0105682 A1 * | 6/2003 | Dicker et al. | 705/27 |
| 2003/0208488 A1 * | 11/2003 | Perrizo | 707/6 |
| 2004/0034652 A1 * | 2/2004 | Hofmann et al. | 707/102 |
| 2004/0103108 A1 * | 5/2004 | Andreev et al. | 707/100 |
| 2005/0044110 A1 * | 2/2005 | Herzenberg et al. | 707/104.1 |

* cited by examiner

Mine

- Site Usage
  - Visit Duration per User
  - Referring URI
  - Keywords Searched
  - Category Analysis
  - Event Analysis
  - Funnel
- Customer
  - Usage by Browser
  - User Types
  - User Properties
  - Geographic Analysis
  - Recency Analysis
  - Frequency Analysis
- Data Mining
  - Category Affinity
  - Entry Path Explorer
  - ☒ Stock Recommendation
  - Discussion Board
  - Recommendation
  - User Segmentation
  - Stock Affinity
  - Discussion Board Affinity
- Products and Transactions
  - Product Performance
  - Product Properties
  - Daily Transaction Activity
  - Referral Transaction
  - Activity Glossary Known Issues

All Stocks
- $compx (6708)
- $indu (5743)
- $now (3132)
- $rut.x (749)
- $spx.x (31374)
- a.(2711)
- aa. (1095)
- aapl (9667)
- abf (184)
- abgx (262)
- abs (400)
- absc (165)
- abt (686)
- ack (206)
- acrt (236)

Find: ____

Selected
xnx (4933)

RECOMMEND

| Recommended | Score |
|---|---|
| $spx.x | 9.6 |
| intc | 7.2 |
| csco | 5.5 |
| msft | 3.9 |
| xerox | 3.0 |
| mni | 2.1 |
| arm | 1.9 |
| nbx | 1.9 |
| bt.a | 1.8 |

590 — 591 — 592 — 593 — 594

*Fig. 5* digMine

Address: https://demo.digmine.com/H0020/default.asp

- Site Usage
  - ☐ Visit Duration per User
  - ☐ Referring URL
  - ☐ Keywords Searched
  - ☐ Category Analysis
  - ☐ Event Analysis
  - ☐ Funnel
- Customer
  - ☐ Usage by Browser
  - ☐ User Types
  - ☐ User Properties
  - ☐ Geographic Analysis
  - ☐ Recency Analysis
  - ☐ Frequency Analysis
- Data Mining
  - ☐ Category Affinity
  - ☐ Entry Path Explorer
  - ☐ Stock Recommendation
  - ☐ Discussion Board Recommendation
  - ☐ User Segmentation
  - ☒ Stock Affinity
  - ☐ Discussion Board Affinity
- Products and Transactions
  - ☐ Product Performance
  - ☐ Product Properties
  - ☐ Daily Transaction Activity
  - ☐ Referral Transaction Activity
- Glossary
- Known Issues

Hide Table | Hide Filter | Hide Message   Print | Help

*ABC Company Reports available from 10/1/2000 to 10/22/2000*

User Type: [All ▼]   Date Range: By: [Weekly ▼] Week: [10/1/2000 - 10/7/2000 ▼] Top: [10]   Users ○ Visits ●   [Refresh]

Total Unique Users for this time period: 234,380 /—601

Show only combinations containing at least [2] /—602 item(s).

Show only combinations containing this item: [xrx ▼] /—603

/—609

| Combinations | Unique Users | Combined as % of Item |
|---|---|---|
| $spx.x /—611 | 31,369 | 3.34% |
| xrx /—612 | 4,919 | 21.32% |
| Combined | 1,049 /—613 | ⎫ 610 |
| intc /—621 | 18,297 | 4.31% |
| xrx /—622 | 4,919 | 16.06% |
| Combined | 790 /—623 | ⎫ 620 |
| csco /—631 | 18,970 | 3.66% |
| xrx /—632 | 4,919 | 14.14% |
| Combined | 696 /—633 | ⎫ 630 |
| msft /—641 | 14,891 | 4.58% |
| xrx /—642 | 4,919 | 13.88% |
| Combined | 683 /—643 | ⎫ 640 |

*Fig. 6*

OPTIMIZED A PRIORI TECHNIQUES

CROSS-REFERENCE TO RELATED APPLICATIONS

This application claims the benefit of U.S. Provisional Application No. 60/301,917, filed Jun. 29, 2001, which is hereby incorporated by reference in its entirety.

TECHNICAL FIELD

The present invention is directed to the fields of generating and presenting item recommendations.

BACKGROUND

In some situations, it can be desirable to recommend particular items in a set based upon a selection of other items in the set. For example, for a set of products offered for sale by a merchant, when a customer has selected one of the products, such as by visiting a web page describing the product, it can be desirable to recommend another one of the products offered by the merchant that is commonly purchased by purchasers of the selected products.

Conventional approaches to generating and presenting such recommendations are extremely limited. For example, conventional recommendation generation approaches are typically very closely tied to a particular implementation of a particular recommendation technique, generally making it difficult to substitute an alternative recommendation technique, or implementation thereof, for an existing technique, and difficult to compare the results of different recommendation techniques or implementations thereof.

Additionally, conventional recommendation presentation techniques often involve displaying a recommendation in response to the display of a particular web page representing an item in the set. This can be a cumbersome interface to use. Additionally, it is an interface that generally precludes the simultaneous selection of several items to be the basis for a recommendation.

Based on shortcomings of conventional approaches to generating and presenting recommendations such as those described above, an improved approach to generating and presenting recommendations would have significant utility.

BRIEF DESCRIPTION OF THE DRAWINGS

FIG. 5 is a display diagram showing an exemplary display produced by the user interface to generate another set or recommendations.

FIG. 6 is a display diagram showing an exemplary display generated by the user interface showing additional information about relationship between recommended items and the selected seed items.

DETAILED DESCRIPTION

Figure 1:
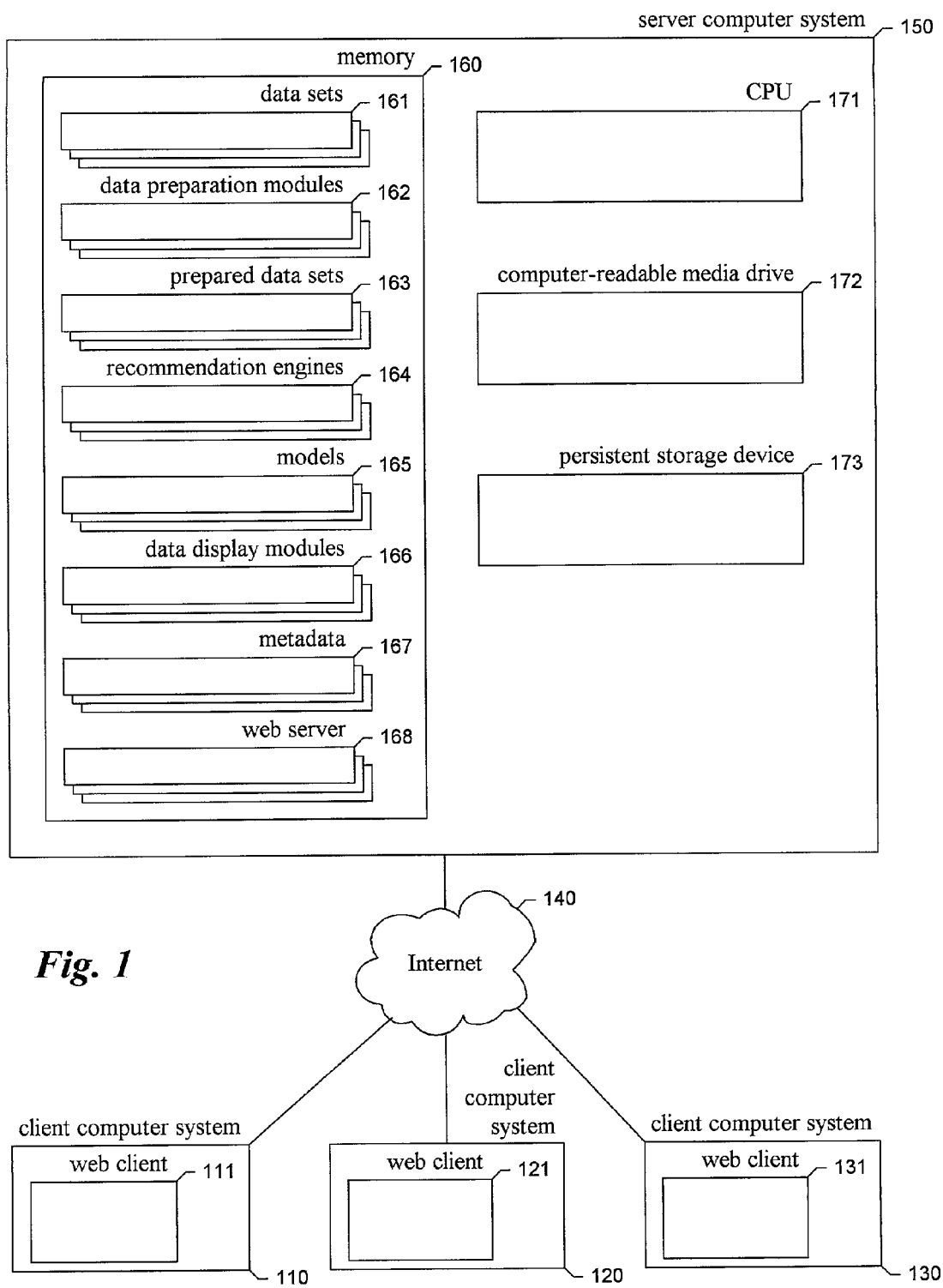
FIG. 1 is a high-level block diagram showing a typical environment in which the facility operates.

A software facility for generating and presenting item recommendations ("the facility") is described. Item recommendations are useful to users who recognize that they have an interest in certain items in a set, such as products or stocks, and wish to identify additional items in the set in which they may also be interested. Some recommendation techniques utilized by the facility use data identifying groups of items in which other users have demonstrated interest, called "occurrence data." For example, such data may identify, for every order placed from a merchant, the list of products included in the order. By analyzing such data, it may be possible to determine that orders that include olive oil and garlic often also include fettuccini. On this basis, if a user indicates an interest in olive oil and garlic, the facility may recommend fettuccini.

In various embodiments, the facility provides a recommendation user interface that lists all of the items in a particular universe of items. For example, the user interface may list the symbols for all stocks listed on the New York Stock Exchange and the American Stock Exchange. From the list of all items, the user can select one or more "seed items." In response, the facility displays a list of items recommended on the basis of the selected seed items. In some embodiments, each of these recommended items is accompanied by a numerical score indicating the extent to which the item is recommended. In some embodiments, the user interface further enables the user to select the set of occurrence data to use in generating the displayed recommendations, and/or to select one of a number of recommendation engines that each use a different technique to generate recommendations based upon this occurrence data. This user interface enables users to exercise a significant degree of control over the generation of recommendations, in a highly intuitive manner.

In some embodiments, the facility provides a framework for generating recommendations from various occurrence data sets using various recommendation engines applying a variety of recommendation techniques. This framework facilitates the straightforward integration of additional occurrence data sets and recommendation engines. The framework optimizes the generation of recommendations by periodically subjecting the available occurrence data sets to processing by the recommendation engines to produce higher-level occurrence models, from which recommendations can be more efficiently generated when requests for such are received in real-time.

In certain embodiments, the facility employs an a priori recommendation engine featuring one or more performance optimizations. In various embodiments, these include: representing the a priori tree that maintains the state of the recommendation engine during processing with one hash map per level of the tree, which generally reduces overall memory consumption; lazily adding nodes to at least one level of the tree, which generally reduces peak memory consumption; dimensioning each new level of the tree based upon the makeup of the existing levels, which generally reduces overall memory consumption; and omitting to consider cases, also called instances, in the occurrence data that contain fewer items than the candidate groups currently under consideration, which generally reduces execution time. Each of these optimizations typically improves the performance of the a priori recommendation engine.

FIG. 1 is a high-level block diagram showing a typical environment in which the facility operates. The block diagram shows several client computer systems, such as client computer systems 110, 120, and 130. Each of the client computer systems has a web client computer program for browsing the World Wide Web, such as web clients 111, 121, and 131. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 typically contains elements of the facility, including: item co-occurrence data sets 161 for use in generating item recommendations; data preparation modules 162 that transform the data sets 161 into prepared data sets 163 that are in a form for consumption by recommendation engines 164, which transform the prepared data sets 163 into recommendation models 165; data display modules 166 for generating recommendations from the models 165; and metadata 167 used to guide the actions of the data preparation modules, recommendation engines, and/or data display modules. The memory typically further contains a web server computer program 168 for delivering web pages in response to requests from web clients, such as web pages containing item recommendations generated by the data display modules. The interaction of elements 161–168 is described in greater detail below. While elements 161–168 are preferably stored in memory while being used, those skilled in the art will appreciate that these elements, or portions of them, maybe be transferred between memory and a persistent storage device 172 for purposes of memory management and data integrity. The server computer system further contains one or more central processing units (CPUs) 171 for executing programs, such as programs 162, 164, and 168; and a computer-readable medium drive 172 for reading information or installing programs such as the facility from computer-readable media, such as a floppy disk, a CD-ROM, or a DVD.

While illustrative embodiments are described in terms of the environment described above, those skilled in the art will appreciate that the facility may be implemented in a variety of other environments, including a single, monolithic computer system which operates both as a server computer system and a client computer system, as well as various other combinations of computer systems or similar devices. For instance, any of the client computer systems may be any device with a display and the capability to receive reports such as a TV, PDA, pager, or phone. There may also be intermediate networks either between the reporting computer system and the Internet or between the Internet and the client computer system.

Figure 2:
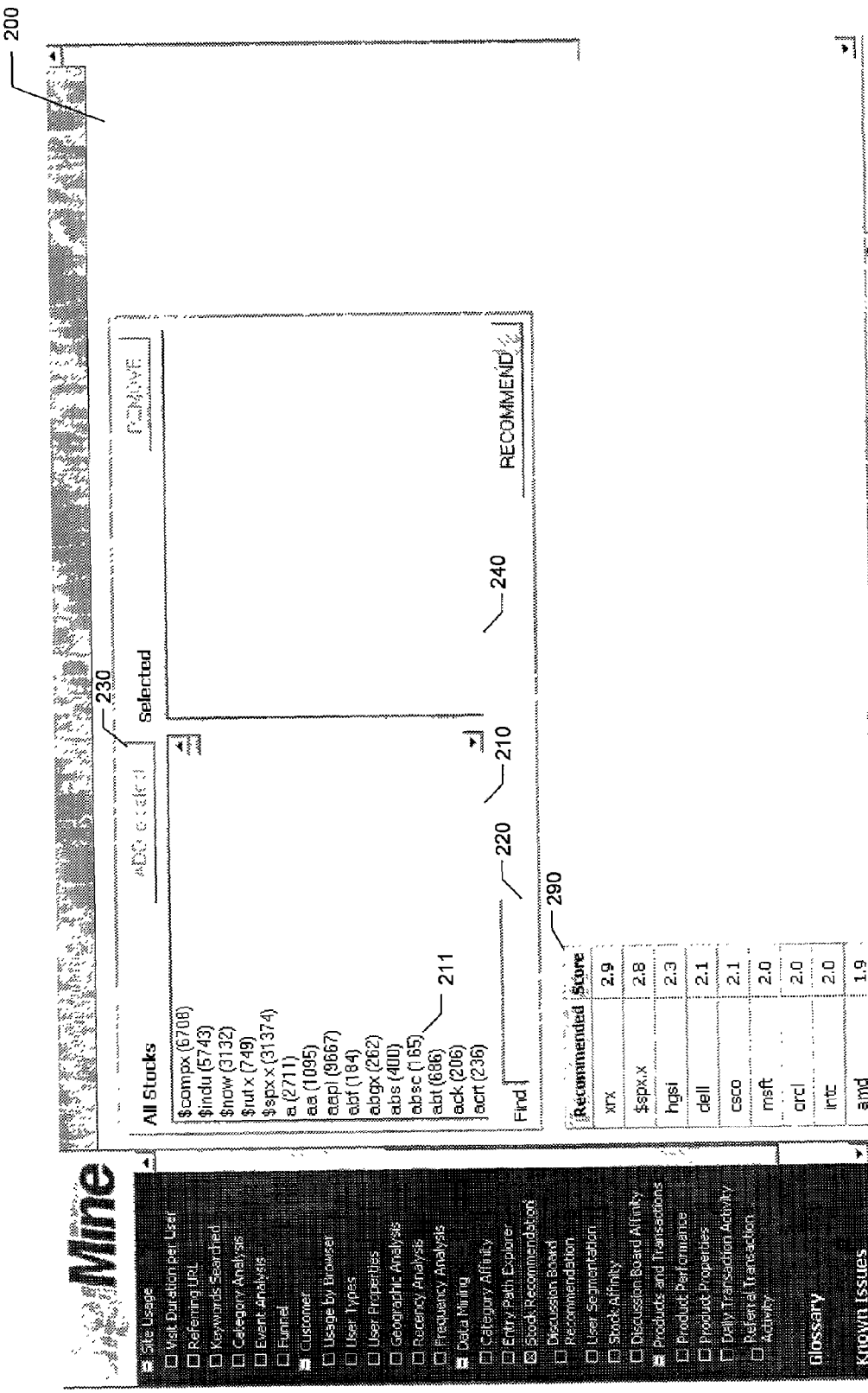
FIG. 2 is a display diagram showing an exemplary initial display produced by the user interface.

FIGS. 2–6 are display diagrams showing exemplary displays produced by the user interface provided in some embodiments of the facility. FIG. 2 is a display diagram showing an exemplary initial display produced by the user interface. The initial display 200 is presented in the client area of the application window for a web browser executing on the client computer system. In alternative embodiments, however, the facility presents this and other displays of the user interface in various other ways using various other tools.

The display 200 includes a candidate item pane 210 containing a list of candidate items from which the user may select. In many embodiments, these candidate items are the universe of items of a particular item type. In the example shown, these items are stock symbols. For example, candidate item 211 is the stock symbol "ABSC." In this example, each candidate item is accompanied by an indication of the number of different cases in which the stock symbol appears. For example, the display indicates that candidate 211 occurs in 165 different cases. These cases may relate to any action or actions that tend to group items together. For example, in this case, the inclusion of a group of stocks in a particular case may represent: the purchase of all of these stocks within a given period of time, such as a day, by a single investor; a single user accessing a set of web pages each containing information about one of these stocks within a single browsing session; a single stock-charting request that requested the charting together of all of these stocks; etc. It can be readily appreciated that the cases used by the facility may be defined in a wide variety of ways.

The facility typically provides a mechanism for candidate items in pane 210 to be moved to a selected items pane 240 for use in generating a recommendation. In various embodiments, this may be done by clicking on an individual candidate item, such as candidate item 211, then on an add button 230; double clicking on an individual candidate item; dragging a candidate item from pane 210 to pane 240; etc. Additionally, the user may type part or all of the candidate item's name into find field 220 in order to scroll the list of candidate items in pane 210 to show that candidate item. Additionally, in some embodiments, the facility at this point displays a list 290 of recommended items. Because these items are recommended on the basis of no selected candidate items, or "seed items," these initial recommendations may be of little significance to many users.

Figure 3:
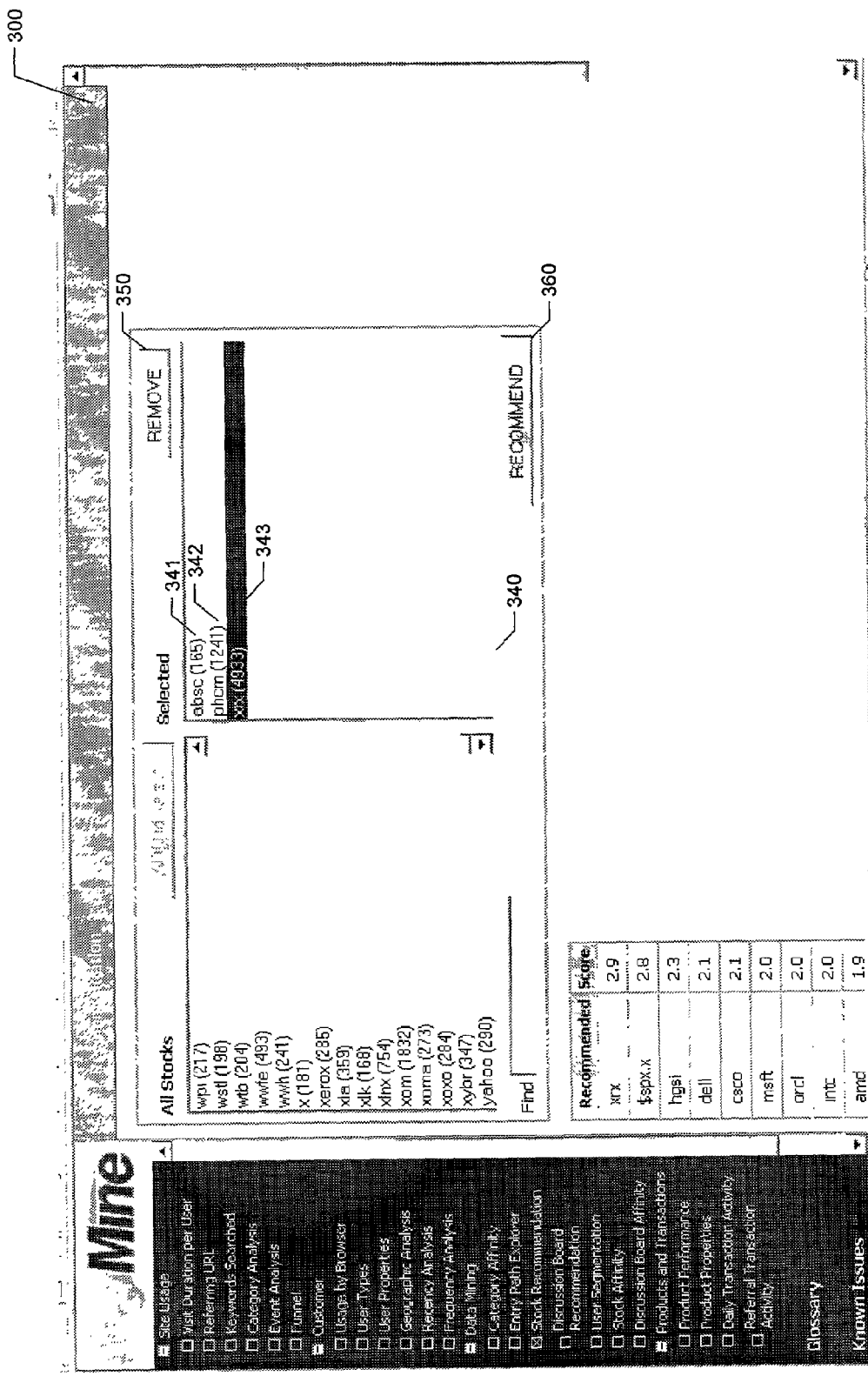
FIG. 3 is a display diagram showing an exemplary display produced by the user interface showing the selection of candidate items.

FIG. 3 is a display diagram showing an exemplary display produced by the user interface showing the selection of candidate items. It can be seen in display 300 that the selected items pane 240 contains three candidate items selected from a list of candidate items in pane 210 in FIG. 2: items 341, 342, and 343. At this point, the user may click remove button 350 in order to deselect the highlighted item, click on one of the other items to change them to the highlighted item, or click recommend button 316 in order to generate a recommendation using these three items as seed items.

Figure 4:
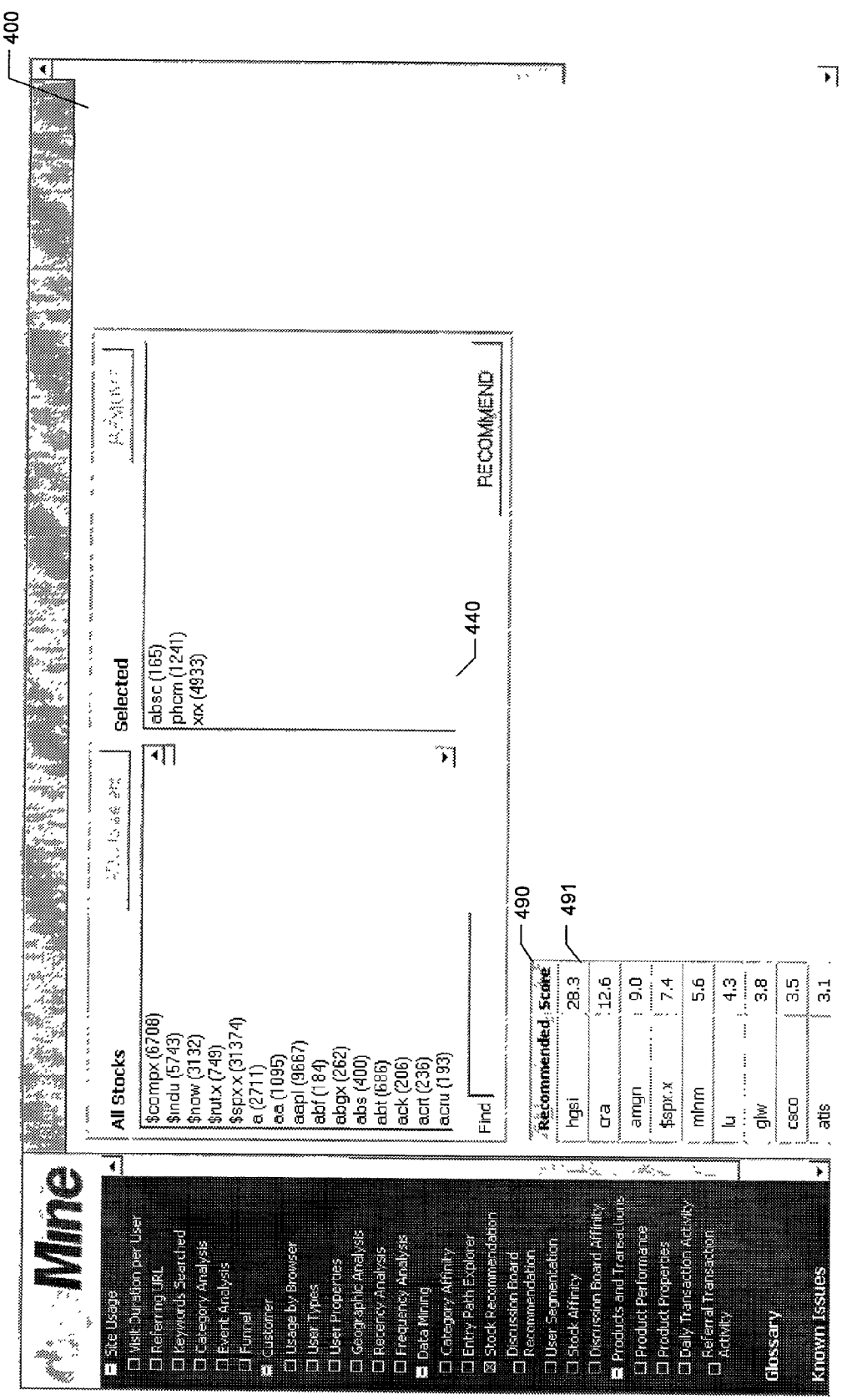
FIG. 4 is a display diagram showing an exemplary display produced by the user interface presenting item recommendations.

FIG. 4 is a display diagram showing an exemplary display produced by the user interface presenting item recommendations. In display 400, recommendation table 490 contains rows each corresponding to a single recommended item. For example, row 491 corresponds to recommended item "HGSI." In this example, each recommended item is accompanied by a score indicating the extent to which the item is recommended. For example, the score for recommended item "HGSI" is 28.3, which is the highest score among the recommended items. Various approaches to generating the list of recommended items and/or the recommendation scores shown in recommendation table 490 are discussed below. In addition, those skilled in the art will appreciate that a wide variety of other recommendation processes may be used to produce recommendations that are based upon the selected items shown in pane 440.

FIG. 5 is a display diagram showing an exemplary display produced by the user interface to generate another set or recommendations. The display 500 shows a recommended items table 590 containing items recommended based upon a single seed item, "XRX." Rows 591–594 of the recommended item table show the items having the top four recommendation scores. In some embodiments, the user may select items in the recommended items table 590 to see additional data underlying the recommendation of these items based upon the seed item or items.

FIG. 6 is a display diagram showing an exemplary display generated by the user interface showing additional information about relationship between recommended items and the selected seed items. The display 600 shows the total number of cases 601 used in the recommendation analysis. In this case, each case corresponds to a single unique user, and there are 234,380 of them. The display also contains a field 602 that the user may use to specify the size of combinations of items the user wishes to see additional information about. The display also contains a control 603 for selecting an item that the displayed combinations must contain. The facility preferably sets field 602 to numeral 2 and control 603 to the seed item in order to produce a list of combinations corresponding the seed item (or items) plus each recommended item.

The display contains table 600, which in turn contains entries 610, 620, 630, and 640 each corresponding to a combination of the seed item and one of the top recommended items. For example, entry 620 corresponds to top recommended item shown in row 592 of FIG. 5. In each case, the entry indicates the number of cases containing both the seed item and recommended item. For example, combined case counts 623 and entry 620 indicates that there are 790 cases that contain both the seed item "XRX" and top recommended item "INTC." These entries may also contain additional information about these items.

In addition to the user interface features shown in FIGS. 2–6 and discussed above, the user interface provided by some embodiments of the facility may include additional features. These include, but are not limited to: generating an updated recommended items table each time an item is added to or removed from the selected items pane; including one or more controls that enable the user to select aspects of the case data used to perform recommendations, such as the kind of items occurring in the cases, the set of events that define each case, the period of time to which the cases relate, the geographic or other division from which to use cases, the data provider from which to obtain case data, etc.; and displaying one or more controls that the user may use to control the recommendation process, such as the recommendation technique to be employed, the particular recommendation engine implementing that technique to be used, and parameters to be used to control the operation of this recommendation engine, etc. Those skilled in the art will appreciate that the user interface could further incorporate additional features, or incorporate a subset of those features discussed here.

Figure 7A:
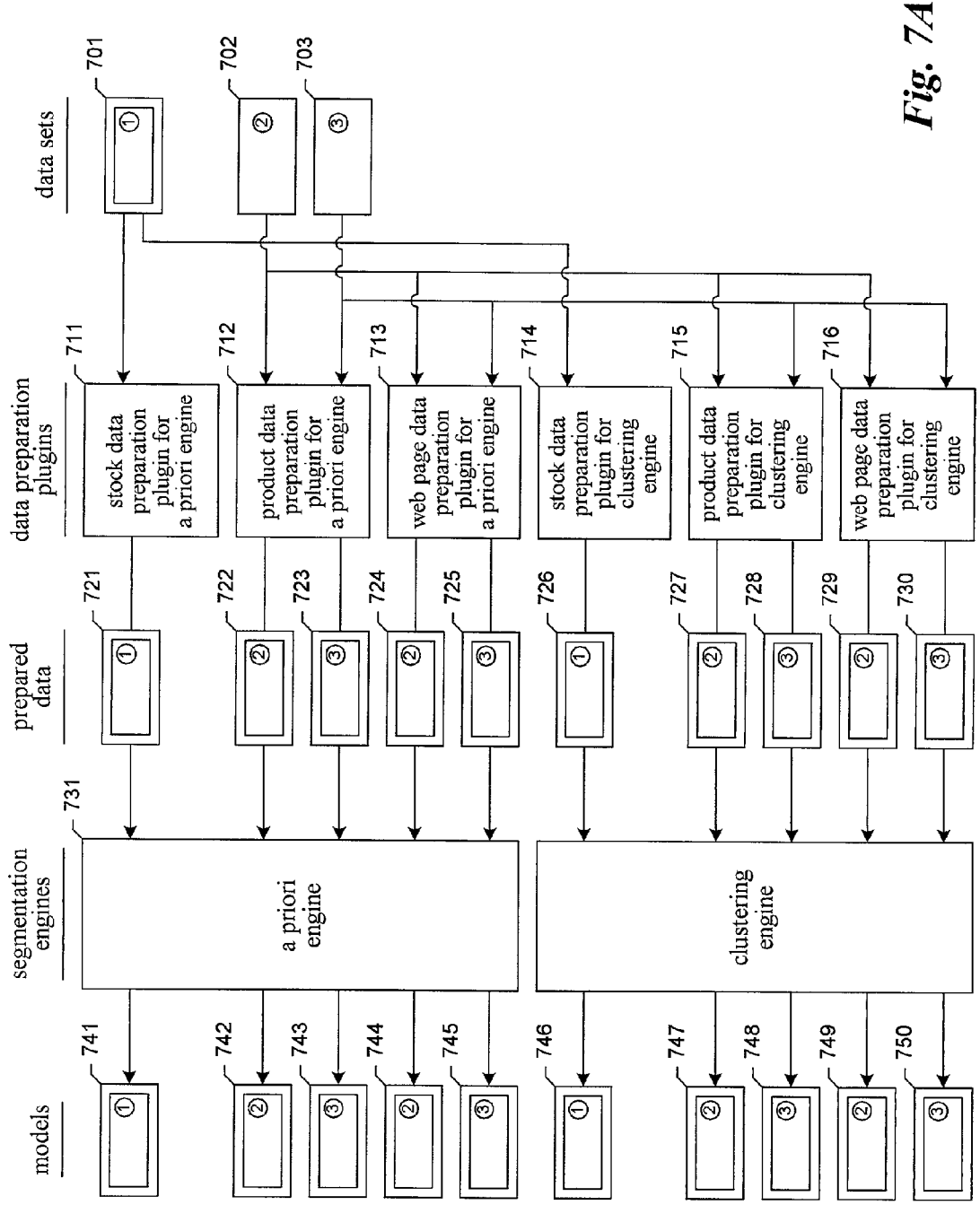
FIG. 7A is a data flow diagram illustrating the model generation stage of the recommendation framework provided by some embodiments of the facility.
Figure 7B:
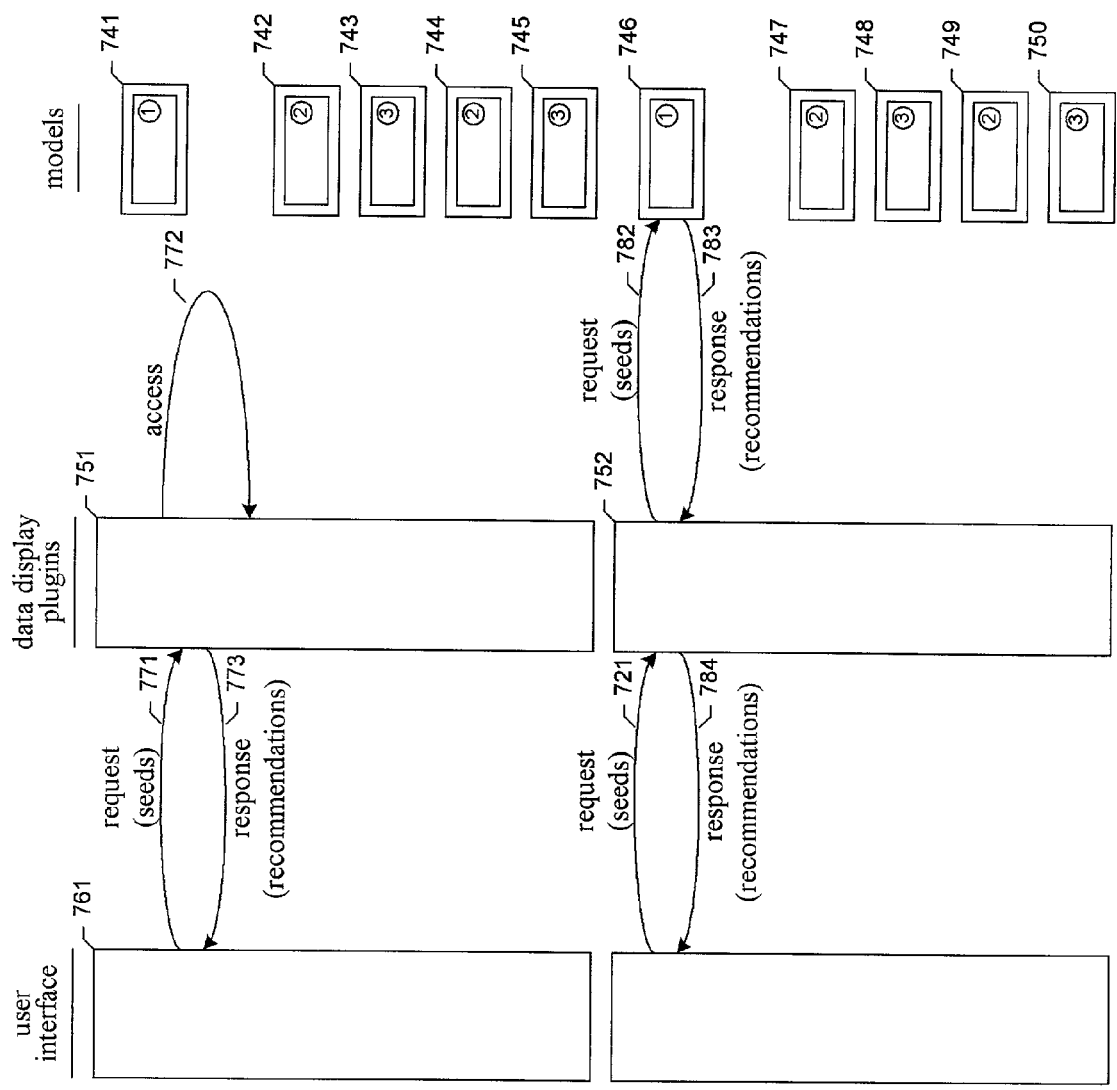
FIG. 7B is a data flow diagram illustrating the second, recommendation generation stage of the recommendation framework provided by some embodiments of the facility.

Some embodiments of the facility provide a framework for generating recommendations utilizing any of a number of item occurrence data sets, and segmentation engines implementing different segmentation techniques upon which recommendations are based. FIGS. 7A–7B are data flow diagrams illustrating the recommendation framework. At a high level, the process employed by the framework breaks down into two stages: a model generation stage, in which segmentation engines are used to transform occurrence data sets into models from which recommendations may be efficiently generated, and a recommendation generation stage in which a model is used to generate a particular recommendation.

FIG. 7A is a data flow diagram illustrating the model generation stage of the recommendation framework provided by some embodiments of the facility. The diagram show three occurrence data sets, also called case data sets, 701–703. Each of these initial data sets also bears a circled numeral, from 1 to 3, to assist in following its processing throughout the framework. Initial data set 701 is further highlighted with a double-border for this purpose.

The data sets consumed by the facility may be provided from a variety of sources. In some cases, the data sets are derived from web server logs that record web browsing activity with respect to a particular web site. As discussed above, the data sets processed by the facility may have a variety of contents, significance, and formats. In this example, data set 701 contains cases each comprised of one or more stock items, while data set 702 and 703 is made up of cases each comprising one or more visited web pages. A proper subset of these web pages each contain detailed information about a particular product.

The facility processes data sets 701–703 through data preparation plugins—or data preparation modules of other types—and segmentation engines to produce models from which specific recommendations may be efficiently generated. In some embodiments, the facility performs such processing automatically in accordance with a schedule. For example, the facility may re-generate models from data sets monthly, weekly, daily, hourly, minutely, etc.

In some embodiments, this process is driven by computer programs, such as those comprised of scripts, that generate models in accordance with one or more model specification data structures. The contents of these model specification data structures are sometimes called "model metadata." For each model to be generated, the model specification data structure identifies a data set from which to obtain case data, a segmentation engine to be used to generate the model from the case data and any parameters needed by the segmentation engine to do so, a data preparation plugin for transforming the identified data set into a form designed for consumption by the segmentation engine and any parameters needed by the data preparation plugin to do so, and a schedule indicating when the model is to be generated.

One exemplary organization of such a model specification data structure is shown below in Table 1.

TABLE 1

| Column Name | Description |
| --- | --- |
| Combold | Id to identify the actual model |
| Description | text description or what the model is. Can be stock, product, page category or whatever you want to know the association |
| DataPreparationPlugin | XML specifying the configuration for the plugin module for data preparation |
| Prefix | Unique string we need for database bookkeeping purpose (the resulting data will be stored in tables with the prefix in the database or files in the file system) |
| AggregationType | Tells the controller program how often the models need to be built |
| Windows | Specify the window of data to use, −1 to default to the week for weekly and the month's data for the month |
| DisplayPlugin | XML specifying the configuration for the plugin module for data display |
| MinThresholdByCount | Specify the minimal threshold by absolute count. The engine will discard any item sets with count less than this. |
| MinThresholdByPercentage | Specify the minimal threshold by percentage of the total number of cases. Again, the engine will discard item sets with count less than this. If both by percentage and by count are specified, the engine will pick the |

TABLE 1-continued

| Column Name | Description |
| --- | --- |
| | maximum or the two after the first pass thru the data. |

A sample row of a model specification data structure organized in accordance with Table 1 is shown below in Table 2.

TABLE 2

| | |
| --- | --- |
| ComboId | 1 |
| Description | Stock Combo |
| Prefix | StockCombo |
| Aggregation -Type | A |
| MinThreshold -ByCount | 5 |
| MinThreshold -ByCount | −1 |
| DataPreparationPlugin | <ComModule Name="digiAsscociation.Stock"/> |
| DisplayPlugin | <SQLModule Name = "SPStockDisplay"> |
| Windows | −1 |

In general, one data preparation plugin is provided for the intersection of each segmentation engine and each data set that that segmentation engine is to process. The data preparation plugin is specially adapted to input data in the form of the data set, and to output the data in the form of prepared data that can be straightforwardly processed by the corresponding segmentation engine. In some cases, where multiple data sets share the same format and item type but contain different sets of cases, a single data preparation plug may be used for all of these data sets. In certain cases, even data sets of different forms, or containing cases made up of different item types, may be processed by the same data preparation plugin. In some such cases, the model specification data structure contains information that enables it to pass different parameters to the data preparation plugin—based upon the identity of the data set—that enable each data set to properly processed.

In addition to reformatting a data set for consumption by a segmentation engine, some data preparation plugins may perform additional operations, such as filtering. For example, a data preparation engine may filter out cases containing certain items, or may delete certain items from all of the cases. As an example of the latter, the product data preparation plugin 712 for the a priori engine may delete from the cases in data sets 702 and 703 items corresponding to visited web pages not containing detailed information about any product, while the web page data preparation plugin 713 for the a priori engine may leave such items intact. Though a data preparation plugin is shown for processing each of the data sets in FIG. 7A, where a data set is already in condition for processing by the appropriate segmentation engine, no data preparation plugin need be provided for that data set.

Once prepared data has been generated from a data set by a data preparation plugin, as prepared data 721 is generated from data set 701 by data preparation plugin 711 for stock data, the facility submits the prepared data to the appropriate segmentation engine. For example, the facility submits prepared data 721 to the a priori segmentation engine. The segmentation engine processes the prepared data to generate a model corresponding to the data set, as model 741 corresponds to data set 701. These models are stored for use in generating particular recommendations. In some cases, they replace a pre-existing model representing an earlier version of the same data set. The makeup of the produced models varies based upon the nature of the segmentation engines that produce them. In general, each model conveys information describing the patterns in which items tend to co-occur in the corresponding data set.

The framework enables any number of segmentation engines to be utilized by the facility. A new segmentation engine may be added to framework that uses a segmentation technique not represented among the segmentation engines already incorporated, or it may be a new implementation of a segmentation scheme used by an existing segmentation engine. For example, an a priori segmentation engine implemented as described further below may be incorporated in the framework. A clustering segmentation engine may also be used, such as the clustering segmentation engine included with some versions of Microsoft Commerce Server, provided by Microsoft Corporation of Redmond, Wash. Segmentation engines implementing other segmentation schemes may also be employed, such as those using decision trees, density estimation, various Information Retrieval techniques, and other segmentation techniques.

FIG. 7B is a data flow diagram illustrating the second, recommendation generation stage of the recommendation framework provided by some embodiments of the facility. FIG. 7B shows that, in this stage of the recommendation framework, data display plugins 751 and 752—or data display modules of other types—use the generated models to generate recommendations in response to recommendation requests received from the user interface 761. There is generally a 1-to-1 correspondence between data display plugins and segmentation engines, since the makeup of models varies with the segmentation engine used to generate them. In doing so, the facility uses data stored in one or more recommendation specification data structures. The contents of the recommendation specification data structures are sometimes called "recommendation metadata."

The recommendation specification data structure provides information needed to generate a recommendation from any of the models. Such information typically includes the location where the model is stored, information identifying a data display plugin designed to generate recommendations from the models generated by a particular segmentation engine and any parameters needed by the data display plugin to do so.

One exemplary organization of such a recommendation specification data structure is shown below in Table 3.

TABLE 3

| Column Name | Description |
| --- | --- |
| ModelId | Id to specify the model type |
| Description | Human readable text description |
| Display Description | Description Used in the UI |
| Plugin ProgId | ProgId or ClassId of the Plugin Wrapper. This object will support the IdigiPredict interface. |
| Plugin Configuration | XML to be passed to the configuration module |

A sample row of a recommendation specification data structure organized in accordance with Table 3 is shown below in Table 4.

TABLE 4

| ModelId | Description | Display Description | Plugin ProgId | Plugin Configuration |
|---|---|---|---|---|
| 1 | Stock Recommendation Model Using Commerce Server Backend | Stock Recommendation | Digi-Mine.Stock.1 | <DatabaseLocation TableName = "MiningTable" ColumnName = "ModelStream"/> |

While the recommendation generation stage of the recommendation framework may be driven in a variety of ways, in some embodiments, the user interface accesses the recommendation specification data structure to identify and instantiate the appropriate data display browser plugin after invoking an initialization method on the instantiated data display plugin, the user interface 761 passes the data display plugin, such as data display plugin 751, a recommendation request 771 listing the item identifiers of the seed items that define the request. In this method, the data display plugin accesses (arrow 772) the identified model 771 to identify items that are to be recommended based upon the contents of the model and the seeds in the request. The data display plugin returns the item identifiers as a recommendation response 773. These item identifiers are used to display the recommended items in the user interface. The user interface uses a mapping between item identifiers and item names to perform such display, which in some embodiments are provided by calling another method of the data display plugin.

The model accessing approach discussed above in conjunction with model 741 is effective for models comprised of data that can be read by the data display plugin. In some cases, the models, such as model 746, may be executable, and provide their own method for generating recommendation from seed items. In one embodiment, the corresponding data display plugin invokes this method (arrow 783) when it receives a request from the user interface. In another embodiment, the recommendation methods of such models are invoked directly by the user interface using information in the recommendation specification data structure.

Additional embodiments utilize aspects of metadata as described hereafter. In general, the recommendation system takes as input a set of (attribute, value) pairs (e.g., a list of products that have been purchased or viewed). Based on these (attribute, value) pairs, the goal is to list other (attribute, value) pairs which should go with the first set (e.g., predict which other products this user may be interested in purchasing or viewing). Note that a specific example of this is when there is one (attribute, value) pair for input (e.g., the information that a single product was purchase or viewed).

One additional form for recommendation metadata lists the acceptable attributes upon which the recommendations will be made, along with a list of acceptable attributes to recommend. One way this may be implemented is in a database table with schema [Attribute, RecommendInput, RecommendOutput]. The Attribute column lists the names (or IDs) of attributes measured or collected. The RecommendInput column has values of either {0, 1} depending upon whether or not the corresponding attribute should be considered as an input attribute to the recommender system. The RecommendOutput column will have values of either {0, 1} depending upon whether or not the corresponding attribute should be considered as an output of the recommender system. For example, consider Table 5:

TABLE 5

| Attribute | RecommendInput | RecommendOutput |
|---|---|---|
| Age | 1 | 0 |
| State | 1 | 0 |
| Product1 | 1 | 1 |
| Product2 | 1 | 1 |
| Product3 | 1 | 1 |
| ProductN | 1 | 1 |

In this case the recommender will take as input the Age, State and a list of products currently purchased and output recommendations only on other products that the user is likely to be interested in. In this example the recommendation engine will not make recommendation based on the value of Age or State.

Data mining metadata can be divided into two different categories: (i) metadata describing the data that is fed into a data mining engine, and (ii) metadata containing the data mining engine parameters, location of initial data mining model parameters, location to write the data mining model after the engine has processed the data in (i), etc.

Metadata Describing Input Data: In some embodiments, the facility uses 2 tables specifying data that is input into a data mining engine: (i) metadata table for static attributes and, (ii) metadata table for dynamic attributes. It is convenient from a storage perspective to store data for the entity of interest when data mining in 2 tables. The "static" table consists of data which is measured for EVERY entity (e.g., say "age" of a person). The "dynamic" table consists of data which does not occur for every entity, but occurs only for a subset of the entities and hence does not have to be specified for every entity.

The schema for the static attribute table (DMMMetaStaticAttribTable) is: [AttribID, AttribFriendlyName, DBColumnName, UseForEngine, UseForDisplay, AttribType, AttribModelType], where the specified columns have the following definitions: AttribID: unique identifier for the given attribute (integer, GUID); AttribFriendlyName: Human-readable name for the attribute (string); DBColumnName: Name of the column in the generated static attribute table that is fed into the data mining engine; UseForEngine: flag indicating whether or not to use this attribute while building the data mining model; UseForDisplay: flag indicating whether or not to always display this attribute value in the UI for the resulting data mining model; AttribType: the type that the resulting attribute is in the static data mining table; AttribModelType: value indicating how the attribute should be modeled by the data mining engine.

Consider the example in Table 6 below:

TABLE 6

| AttribID | 1 | 2 | 3 | 4 |
|---|---|---|---|---|
| AttribFriendlyName | LogUserID | Number of Visits | Ave Visits Per Day | Is Registered User? |
| DBColumnName | LogUserID | NumVisits | AveVisitsPerDay | IsRegisteredUser |
| UseForEngine | 1 | 1 | 1 | 1 |

TABLE 6-continued

| AttribID | 1 | 2 | 3 | 4 |
|---|---|---|---|---|
| UseForDisplay | 0 | 0 | 0 | 0 |
| AttribType | integer | integer | float | integer |
| AttribModelType | key | continuous | continuous | discrete |

This metadata specifies a static attribute table that will be fed into the data mining engine that has 4 columns: [LogUserID, NumVisits, AveVisitsPerDay, IsRegisteredUser]. The LogUserID column is integer-valued and it is the key, NumVisits is integer valued and it should modeled with a continuous distribution (e.g., a Gaussian distribution), AveVisitsPerDay has floating point values and is continuous, IsRegisteredUser takes integer values (e.g., either 0 or 1) and should be modeled with a discrete distribution (i.e., the values do not imply order).

The schema for the dynamic attribute table (DMMMetaDynamicAttribTAble) is [AttribID, AttribFriendlyName, DynamicAttribType, AttribSource, UseForEngine, UseForDisplay], where the specified columns have the following definitions: AttribID: same as above; AttribFriendlyName: same as above; DynamicAttribType: whether or not this dynamic attribute is derived from a customer's "category", "event", "user" or "Transaction" data; this may include any information collected about the customer; AttribSource: Specification of where the information is stored in the customer's datawarehouse; UseForEngine: see above; UseForDisplay: see above.

Consider the example for the dynamic metadata table in Table 7 below:

TABLE 7

| AttribID | 5 | 6 | 7 |
|---|---|---|---|
| AttribFriendlyName | Home > News | Home > Register | Search |
| DynamicAttribType | Category | Category | Event |
| AttribSource | Home > News | Home > Register | Search |
| UseForEngine | 1 | 1 | 1 |
| UseForDisplay | 0 | 0 | 0 |

The dynamic table that is generated from this metadata has schema: [LogUserID, ActionName, Count]. There are multiple rows in this table for a given LogUser describing the number of times that LogUser performed a given action. Consider the example of the dynamic table below in Table 8:

TABLE 8

| LogUserID | 001 | 001 | 003 |
|---|---|---|---|
| ActionName | Home > News | Search | Home > Register |
| Count | 5 | 1 | 3 |

Metadata describing data mining engine/parameters: In some embodiments, the facility uses a data mining master metadata table (DMMMetaMasterTable) with schema: [ModelID, ModelType, description, prefix, period, window, NumAttributes, SPAttribs, MaxBufferSize, featureSelectionMethod, sampleInModel, SampleWhenAttribs, SampleDegree, SampleMethod, ModelDirectory, HomePageURLID, EngineType], where the specified columns have the following definitions: ModelID: ID for each model configuration (GUID, int); modelType: string indicating what type of data mining model is considered (e.g., Segmentation, DecisionTree, etc.); description: human-readable description of the data mining model; prefix: short string which uniquely identifies this model; period: how often the model should be built (currently either weekly or monthly); window: number of days over which to construct the static and dynamic tables above (e.g., compute attributes for each LogUser from Jan. 1, 2001 to Jan. 31, 2001=>window=31 days); NumAttributes: the number of attributes used to compute the model; SPAttribs: name of the stored procedure to compute the dynamic and static attribute tables; MaxBufferSize: the maximum amount of RAM to allow the data mining process to have; featureSelectionMethod: if the number of attributes computed in the static and dynamic tables is too large for the data mining process, the value of this columns specifies a method for reducing the number of attributes; sampleInModel: flag, indicating whether or not sampling should be done in the data mining engine; sampleWhenAttribs: flag, indicating whether or not sampling should be done when generating the dynamic and static attribute tables; sampleDegree: how much sampling should be done, expressed as a fraction of the total number of rows in the static/dynamic attribute tables; sampleMethod: the method to use to sample; ModelDirectory: Full path to location to write the data mining model file; HomePageURLID: the ID of the homepage of the customer that the data mining model is built over; EngineType: For a given modelType, we may have multiple engines used to build the model. This column specifies the engine that should be used.

Segmentation: The specific parameters for the segmentation models are specified in the table DMMMetaSegParams Table with schema: [modelID, NumOfClusters, ConvergenceThreshold, AllowEarlyTermination, AttributeFraction, ReUseEmtpyClusters, ModelBlob], where the specified columns have the following definitions: ModelID: same as above; NumOfClusters: the number of clusters or segments to search for over the rows of the static/dynamic attribute tables; ConvergenceThreshold: threshold for termination of the segmentation engine; AllowEarlyTermination: flag indicating whether or not the engine is allowed to terminate before processing all of the data in the static/dynamic attribute tables; AttributeFraction: The fraction of the attributes in the static/dynamic tables that should be used by the segmentation engine. If AttributeFraction<1, then the method specified in DMMMetaMasterTable.featureSelectionMethod is used to choose exactly which attributes are input into the engine. ReUseEmptyClusters: flag indicating whether or not to re-use clusters that go empty or to allow them to remain empty; ModelBLOB: the binary contents of the model file are imported to this column for storage in the database. This column is a binary large object.

In some embodiments, the facility utilizes a segmentation engine that implements an optimized a priori segmentation technique. Conventional a priori segmentation techniques are described by *Fast Algorithms for Mining Association Rules* (Agrawal, R. & Srikant, R.; 20th VLDB Conf., Santiago, Chile, 1994). In general, the a priori technique identifies any group of items that occur in more than a threshold number of cases. Groups occurring in at least this threshold number of cases are said to have "minimum support." For the following four cases, numbered one through four, 1: {A, B}; 2: {B, C, D}; 3: {C, D, E}; 4: {D, E}; the a priori technique identifies the following groups having minimum support, where the numbers in parentheses indicate the number of cases in which each group occurs: {B}(2); {C}(2); {D}(3); {C, D}(2); {D, E}(2). For example, the two cases in which the group {B} occurs are 1 and 2, while the three cases in which the group {D} occur are 2, 3, and 4.

Figure 8:
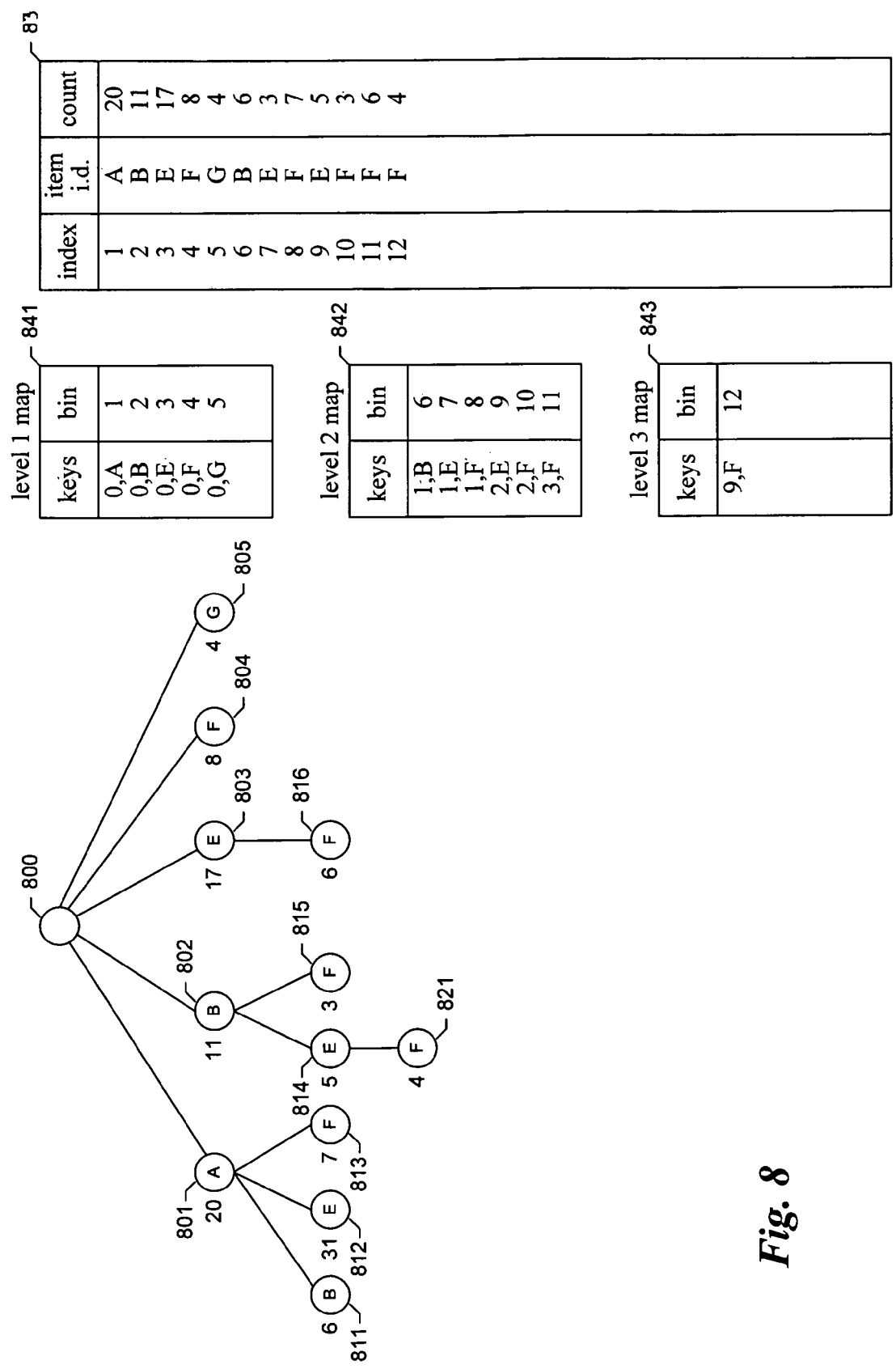
FIG. 8 is a data structure diagram showing exemplary data structures used by the facility to maintain the state of the a priori technique.

FIG. 8 is a data structure diagram showing exemplary data structures used by the facility to maintain the state of the a priori technique. The drawing shows a virtual tree data structure having root node 800. Root node 800 is said to occupy level zero of the tree, while its children, nodes 801–805, are said to occupy the first level of the tree. Nodes 811–16 occupy the second level of the tree, and node 821 occupies the third level of the tree. The a priori technique uses the tree by establishing a node in the tree to represent each group of items of interest. Each of the nodes in level one represent a one-item group—that is, a group of size one. For example, node 802 represents the group {B}. Each node in level two represents a two-item group. For example, node 814 represents group {B, E}. In the same manner, nodes in level three represent three-item groups. For example, node 821 represents the group {B, E, F}. This tree represents the cases listed in Table 9 below.

TABLE 9

| case # | items |
|---|---|
| 1 | A, F |
| 2 | B, E |
| 3 | F |
| 4 | F |
| 5 | A, F |
| 6 | B, E |
| 7 | A, F |
| 8 | E |
| 9 | A, F |
| 10 | A |
| 11 | A, E |
| 12 | A |
| 13 | B |
| 14 | E |
| 15 | E |
| 16 | A, B |
| 17 | E |
| 18 | A, B |
| 19 | B |
| 20 | B |
| 21 | A, F |
| 22 | E |
| 23 | B, E, F |
| 24 | B, E |
| 25 | E |
| 26 | E |
| 27 | A, F |
| 28 | B |
| 29 | F |
| 30 | F |
| 31 | F |
| 32 | F |
| 33 | B |
| 34 | A, E |
| 35 | F |
| 36 | F |
| 37 | A, B |
| 38 | E |
| 39 | A |
| 40 | B, F |
| 41 | B, F |
| 42 | A, B |
| 43 | A, E |
| 44 | A, B |
| 45 | A |
| 46 | E, F |
| 47 | E, F |

TABLE 9-continued

| case # | items |
|---|---|
| 48 | A, F |
| 49 | A, B |
| 50 | E |
| 51 | E, F |
| 52 | E |
| 53 | E |
| 54 | E, F |
| 55 | E |
| 56 | E, F |
| 57 | G |
| 58 | G |

The a priori technique builds the tree one level at a time. The construction of each level corresponds to a single traversal through the case data. For large data sets, the case data must be read from disk for each traversal. Each non-root node has a counter associated with it, used to count the occurrences of the corresponding group encountered during traversal. For instance, during the first traversal of the data set in the example, 20 cases were encountered that contained item A, 11 that contained item B, 17 that contained item E, eight that contained item F, and four that contained item G. During the first traversal, the tree contained additional first-level nodes not shown that were used to count the number of occurrences of items C and D. At the end of this traversal, however, these nodes had counts lower than the minimum support value of three, and were therefore deleted from the tree, leaving only those nodes having minimum support, nodes 801–805.

In conventional a priori algorithms, before a new pass starts, all possible nodes are added to the corresponding level of the tree. For example, before reading the data set the second time, conventional a priori techniques would have added to node 801 children for items B, E, F, and G; to node 802, children for nodes E, F, and G; to node 803, children for items F and G; and to node 804 a child for item G. In some embodiments of the facility, for certain levels of the tree, such as the second level, this pre-traversal exhaustive population of the current level of the tree is foregone. In these embodiments, when the second traversal of the data set begins, the second level of the tree is empty. Each time during this traversal of the data set that the facility identifies a group of two items that are both found in a preceding level of the tree, the facility checks to determine whether a node has been yet created on the second level of the tree to represent this group. If not, the facility dynamically adds such a node to the second level of the tree. The counter for this node is then incremented. By adding nodes to one or more levels of the a priori tree in this manner, the facility is able to avoid the time and memory cost of adding a large number of nodes to the tree corresponding to groups that occur in none of the cases, which will all later be deleted.

In another optimization employed in some embodiments of the facility, during each traversal of the data set, cases are identified that contain no more items than the groups of items being identified in that traversal. The identification of these groups is stored, either within the data set, or in an external data structure, such as a bit map. In future traversals of the data set, these identified cases are skipped, since they have fewer items than the groups now being considered, and therefore, cannot contain any of the groups now be considered. This optimization, where employed, can significantly reduce the amount of time required to perform the a priori technique.

Various conventional underlying representations have been used for the a priori tree, each having a different level of efficiency. A further optimization utilized by some embodiments of the facility is an efficient representation for the a priori tree. An example of this representation corresponding to the tree having root node 800 is shown in FIG. 8. The representation comprises one node array 830 for the entire tree, and one level map for each level of the tree, such as level one map 841 for level one of the tree. Each entry in node array 830 contains the data associated with a single node of the tree. For example, the second item of node array 830 (having index 2) contains the information stored in node 802 of the tree: item identifier B, and count 11. While the data associated with each node is contained in node array 830, the organization of the tree is contained in level maps 841–843. Each of these hash maps uses a hashing function to map a pair of keys to a bin containing data. More specifically, each level map maps keys corresponding to a parent node and its child to the index of the entry of the node array containing the data associated with the child node. In particular, these mapped keys are, for the parent node, the node array index of the parent node, and for the child node, the item identifier of the child node. For example, to find the data associated with node 802, the level one map is used to hash the node array index of node 800 (0) and the identifier for node 802 (B). In the level one map, these keys map to node array index 2, the entry in the node array corresponding to which contains the data associated with node 802: item identifier B, and count 11. To locate the data associated with node 814, the facility uses the level two map to map the node array index of parent node 802 (2) and the item ID of child node 814 (E). In the level two map, these keys map to node array index 9, the entry in the node array corresponding to which contains the data associated with node 814: item identifier E, and count 5. Utilizing this representation of the a priori tree gives embodiments of the facility a high level of both computational and storage efficiency.

In a further optimization incorporated in some embodiments of the facility, the facility calculates the amount of space to reserve for the next level of the a priori tree based upon the existing structure of the a priori tree. In particular, the facility allocates the number of nodes calculated in accordance with the formula in equation (1) below.

$$\text{number of nodes to allocate at level } l = \sum_{N=\text{nodes at level } l-2} \frac{(\text{number of children of } N) \cdot (\text{number of children of } N - 1)}{2} \quad (1)$$

In terms of the example tree, to calculate the number of nodes to allocate to level 3, the facility solves the expression below in equation (2):

$$\text{number of nodes to allocate at level } 3 = \frac{3 \cdot 2}{2} + \frac{2 \cdot 1}{2} + \frac{1 \cdot 0}{2} + \frac{0 \cdot (-1)}{2} + \frac{0 \cdot (-1)}{2} = 3 + 1 + 0 + 0 + 0 = 4 \quad (2)$$

In some representations of an a priori tree, it is not possible or practical to reserve space for certain numbers of nodes on a level. For example, for some representations of the a priori tree, it may not be possible to reserve space for an odd number of nodes. With respect to such representations, the facility preferably further adjusts the number of nodes produced by equation (1), such as by rounding up to the next-highest even number of nodes. By allocating the number of nodes in a level in this manner, the facility is able to reduce the amount of memory needed to represent the a priori tree storage performance of the a priori segmentation technique.

It will be understood by those skilled in the art that the above-described facility could be adapted or extended in various ways. For example, various versions of the described user interface may be used to generate and present recommendations for virtually any types of items using virtually any recommendation technology. Further, various versions of the recommendation framework described may be used to generate recommendations from data sets of virtually any type, using segmentation engines or other recommendation engines of virtually any type. Also, various versions and combination of the optimizations described for the a priori segmentation algorithm may be used in a priori algorithms applied to different problems, and in a variety of other segmentation techniques. While the foregoing description makes reference to certain embodiments, these embodiments are merely exemplary; the scope of the invention is defined solely by the claims that follow and the elements recited therein.

We claim:

1. A method in a computing system for modeling co-occurrence between items in a population using occurrence data identifying, for each of a number of instances, a subset of the population of items that occurred in the instance, comprising:

(a) initializing a model tree data structure;

(b) at a first level of the tree data structure, establishing a node for each of the items;

(c) after (b), reading the occurrence data a first time to arrive at a count, stored in each node at the first level of the tree data structure, of the number of instances in which the item corresponding to the node occurred;

(d) reading the occurrence data a second time, and, for each pair of items encountered in an instance while reading the occurrence data a second time that is comprised of items whose counts exceed a threshold number:

(1) if no node has been established at the second level of the tree data structure for the pair of items, establishing a node at the second level of the tree data structure for the pair of items, initializing a count for the established node, and incrementing the count for the node established at the second level of the tree data structure for the pair of items; and (2) if a node has been established at the second level of the tree data structure for the pair of items, incrementing the count for the node established at the second level of the tree data structure for the pair of items;

(e) at a third level of the tree data structure, establishing a node for each group of three items for which the counts of the pairs that are subsets of the group of three items each have a count that exceeds the threshold number;

(f) after (e), reading the occurrence data a third time to arrive at a count, stored in each node at the third level of the tree data structure, of the number of instances in which the all three of the items corresponding to the node occurred; and (g) recommending an item based on the count.

2. A method in a computing system for augmenting a tree data structure having a preexisting number of levels greater than zero by appending an additional level, the tree data structure modeling co-occurrence between items in a population by identifying groups containing no more than a ceiling number of items corresponding to the preexisting number of levels of the tree data structure that each occurs in at least a threshold number of instances, comprising:

reading occurrence data identifying, for each of a number of instances, a subset of the population of items that occurred in the instance, and, for each set of items encountered in an instance while reading the occurrence data whose size is one greater than the ceiling number of items where the preexisting levels of the tree data structure indicate that all subsets of the set occur in at least a threshold number of instances:

(1) if no node has been established at the additional level of the tree data structure for the set of items, establishing a node at the additional level of the tree data structure for the set of items, initializing a count for the established node, and incrementing the count for the node established at the additional level of the tree data structure for the set of items; and (2) if a node has been established at the additional level of the tree data structure for the set of items, incrementing the count for the node established at the additional level of the tree data structure for the set of items; and recommending an item based on the count.

3. The method of claim 2 wherein the ceiling number of items is one.

4. A computer-readable medium whose contents cause a computing system to augment a tree data structure having a preexisting number of levels by appending an additional level, the tree data structure modeling co-occurrence between items in a population by identifying groups containing no more than a ceiling number of items corresponding to the preexisting number of levels of the tree data structure that each occurs in at least a threshold number instances, by:

reading occurrence data identifying, for each of a number of instances, a subset of the population of items that occurred in the instance, and, for each set of items encountered in an instance while reading the occurrence data whose size is one greater than the ceiling number of items where the preexisting levels of the tree data structure indicate that all subsets of the set occur in at least a threshold number of instances:

(1) if no node has been established at the additional level of the tree data structure for the set of items, establishing a node at the additional level of the tree data structure for the set of items, initializing a count for the established node, and incrementing the count for the node established at the additional level of the tree data structure for the set of items; and (2) if a node has been established at the additional level of the tree data structure for the set of items, incrementing the count for the node established at the additional level of the tree data structure for the set of items; and recommending an item based on the count.

* * * * *